April 16, 1929.  F. BRUNNER  1,709,058
LANDING METHOD FOR AIRCRAFT
Filed July 17, 1926
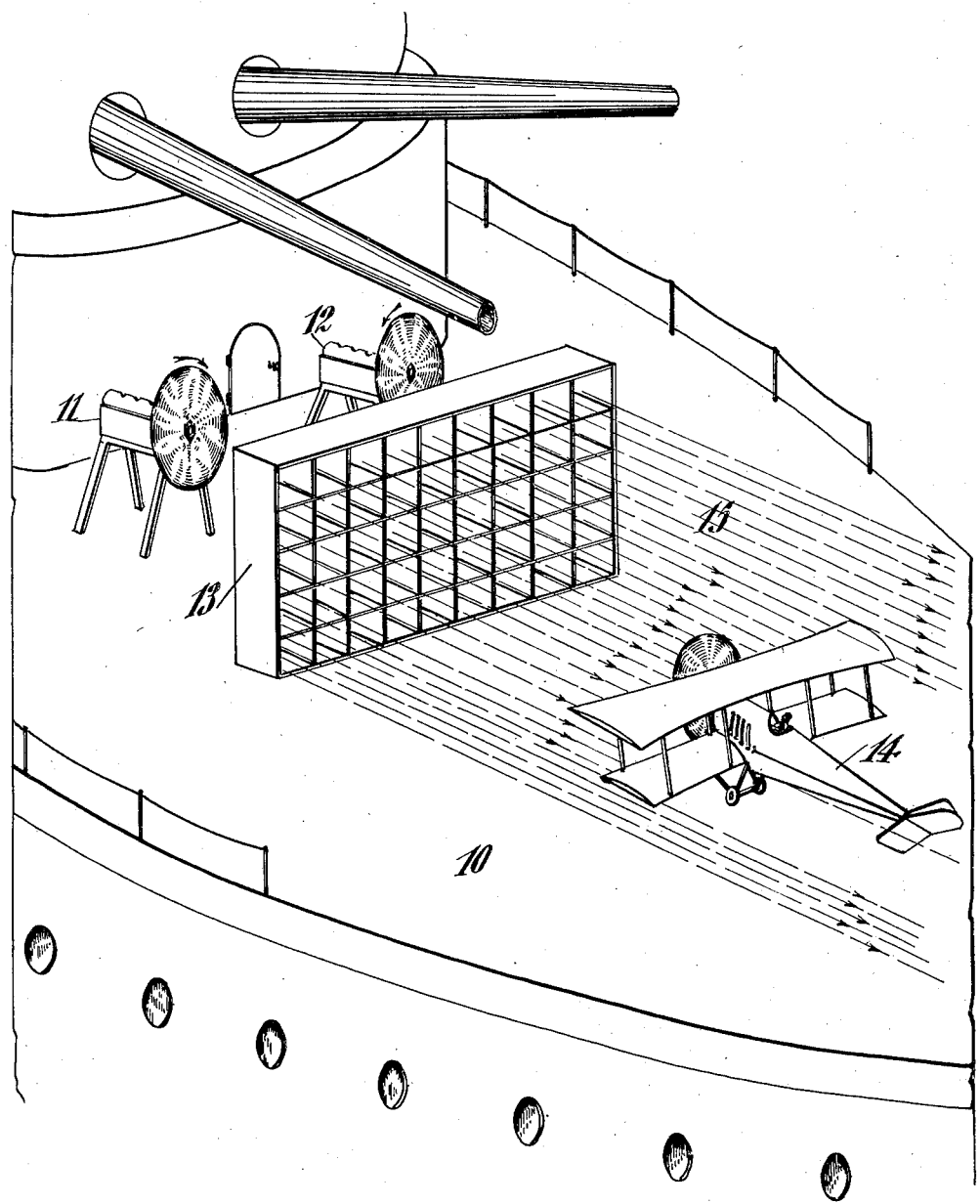
INVENTOR
Frederick Brunner
BY
his ATTORNEY.

Patented Apr. 16, 1929.

1,709,058

UNITED STATES PATENT OFFICE.

FREDERICK BRUNNER, OF CAMDEN, NEW JERSEY.

LANDING METHOD FOR AIRCRAFT.

Application filed July 17, 1926. Serial No. 123,143.

The fact that a landing aircraft of the type used at the present time requires landing fields of considerable length is still one of the main reasons why aviation has not yet reached a higher degree of safety and application to public transportation.

Furthermore, this necessity of a landing field led to the design of numerous devices of more or less practical value. These devices having the purpose of braking the landing speed of a landing airplane and thus reducing the distance required for landing. Devices of this kind are already in use in the Navy in order to facilitate landing on specially provided airplane carriers.

It is quite obvious that all existing landing devices which are based on a mechanical braking action, applied to parts of a landing plane, are naturally apt to give considerable stresses to said parts or to the entire plane. According to the chosen length of the landing platform, the weight of the fully equipped plane and the minimum landing speed required by a particular plane, a certain amount of brakework has to be done in order to consume the inertia of the moving mass of the plane, in other words, bring the plane to a standstill. This amount of brakework may vary from 100,000 to 500,000 foot-pounds or more. Needless to say that the braking of such an inertia must apply considerable stress to the parts of the plane to which the braking forces are applied to and this stress increases tremendously if the brake-distance is lessened, that is, when the landing field available is extremely short.

My present invention has for its object a new method of braking or eliminating the landing speed of aircrafts in which air is used, that is, the medium itself in which the aircraft is flying, as a braking element.

It is a further object of the invention to provide means for producing an artitificial air current toward the landing plane and above and parallel to the landing space, thus providing the air speed which is necessary to keep the plane aloft, even though a fraction only of the propelling power of the power plant is applied, similarly to the performance of a landing airplane against heavy head wind.

This, meaning the use of an air current as breaking element, has the great advantage of securing an absolutely elastic way of braking, the lack of unusually or dangerously increased stresses to any part of the plane and furthermore, the qualities of an automatically progressive braking action. This latter results from the fact that the braking action of the braking medium increases rapidly as the plane is approaching the source of the artificial air current, due to the increase of the air current speed in the vicinity of the air current producing braking device.

It is still a further object of the invention that the air current producing device, which is located at the end of the landing platform, producing an air current of ample speed and width at least equal to the wing spread of the plane used, may be composed of one or more blower devices, preferably airplane engines of ample output and equipped with propellers.

It is a vital part of the invention that the artificially produced air current be free or nearly free of turbulence, that is, rotating motion of the air in order to prevent a disturbance of the equilibrium of the plane floating in this artificial air current. To secure a straight air current free of turbulence, a number of parallel, horizontally or vertically, or both horizontally and vertically provided boards may be placed in front of the blowers or propellers, that is, between the source of the air current and the landing plane. These boards will force the air current to follow a straight path similarly to the air current in a wind tunnel device.

It is a further object of my invention, that the landing device may be used at any place hitherto entirely unsuitable for aircraft landing purposes as, for instance, very small landing fields, building roofs, docks, any kind of floating craft like passenger ships, freight boats, war ships. At high altitudes where the density of the air is so small that a higher landing speed and, therefore, a longer landing field is required, the application of this invention is especially valuable.

Other and further objects of my invention will become readily apparent to persons skilled in the art from a consideration of the following description.

In the accompanying drawing, one practical embodiment of the invention is shown.

The figure is a perspective view showing one manner of application of my invention to a fragment of a battleship.

In this drawing 10 indicates a landing field or platform on deck of a battleship. 11 and 12 are blowing devices for producing an artificial air current, which blowers should preferably rotate in opposite direction to each other. The artificially produced air current passes a grill or honeycomb baffle 13 or a similar device for diminishing turbulence and directing the air current parallel and above the landing field 10. As shown the approaching air plane 14 is kept floating in the artificial air current 15 so that the pilot of the plane can select a proper place for landing.

The practical application of my invention will be as follows:—

The pilot of the landing airplane 14 steers the plane directly into the path 15 of the artificial air current which is blowing against the flying craft. As soon as the pilot feels the braking action of this counter current, he throttles his engine down gradually and carefully in order to maintain the plane slightly above the so-called stalling speed, which can be done easily by watching the air speed indicating instrument. At the point where the propelling force of the airplane or, in other words, the thrust is equal to the resistance produced by the artificial air current, the plane will remain at a standstill in relation to the ground or platform 10. This point, however, should be a certain distance ahead of the platform on which the plane is to be landed. By gradually opening up the throttle of the airplane engine, the pilot is able to advance the ship slowly until it reaches the proper place on the platform, with the landing carrier, the wheels or floats nearly touching the receiving platform. At this moment the artificial brake air current 15 is shut down and at the same time the pilot shuts down his own engine. It is quite evident that the lifting power of the plane decreases at the rate of the throttling of both, the artificial air current and the propelling force of the plane which naturally causes the plane to rest on the platform.

The steering into the artificial air current, the control of the propelling power of the plane in order to advance to the proper place on the platform are not more difficult manœuvres than a landing performed against a heavy wind on an ordinary landing field and can be done by an experienced pilot on any standard air plane.

From the foregoing it is apparent that the present invention provides a new and important method for braking the landing speed of aircrafts, especially adaptable for use in hitherto unsuitable landing fields as building roofs, naval vessels or otherwise limited landing spaces and furthermore, due to the application of moving air as a braking force, dangerous stresses on the aircraft or on parts of same are eliminated.

While I have described what I consider the preferred form of my invention, I do not limit myself to the form shown but claim as my invention any method and device coming within in the scope of the appended claims.

What I claim as new is:—

1. The method of braking the speed of a landing aircraft which consists in directing the aircraft into an artificially produced air current which is directed directly opposite to the direction of travel of the aircraft and which is adapted to keep the aircraft aloft until the latter has reached the proper position on the landing field.

2. The method of braking the speed of a landing aircraft which consists in steering the aircraft against an artificially produced air current of ample pressure and throttling the aircraft engine gradually down and maintaining the aircraft slightly above the stalling speed in said current until the propelling force of the aircraft is equal to the resistance of said current, opening up the throttle of the aircraft engine gradually until the aircraft reaches the proper position on the landing field thereby causing the landing gear of the aircraft to nearly touch the field and shutting down both the said current as well as the aircraft engine.

3. The method of landing aircraft which consists in keeping the aircraft aloft in an artificially produced air current until the relative velocity in respect to the landing space will be zero.

4. The method of landing aircraft which consists in directing the aircraft into an artificially produced air stream and keeping said aircraft above the velocity of the stalling speed until it is advanced to the place where the aircraft should come to a stop.

5. The method of braking the speed of a landing aircraft which consists in directing the aircraft into an artificially produced air current which is directed directly opposite to the direction of travel of the aircraft and which is adapted to act against the forward movement of the aircraft until the latter has reached the proper position on the landing field.

6. The method of braking the speed of a landing aircraft which consists in steering the aircraft against an artificially produced air current of ample pressure and throttling the aircraft engine gradually down and maintaining the aircraft slightly above the stalling speed in said current until the propelling force of the aircraft is equal to the resistance of said current, opening up the throttle of the aircraft engine gradually until the aircraft reaches the proper position on the landing field and shutting down both the said current as well as the aircraft engine.

In testimony whereof I affix my signature.

FREDERICK BRUNNER.